Feb. 3, 1942.  H. W. HEM  2,272,150
WEIGHING SCALE
Filed Nov. 29, 1937  4 Sheets-Sheet 2
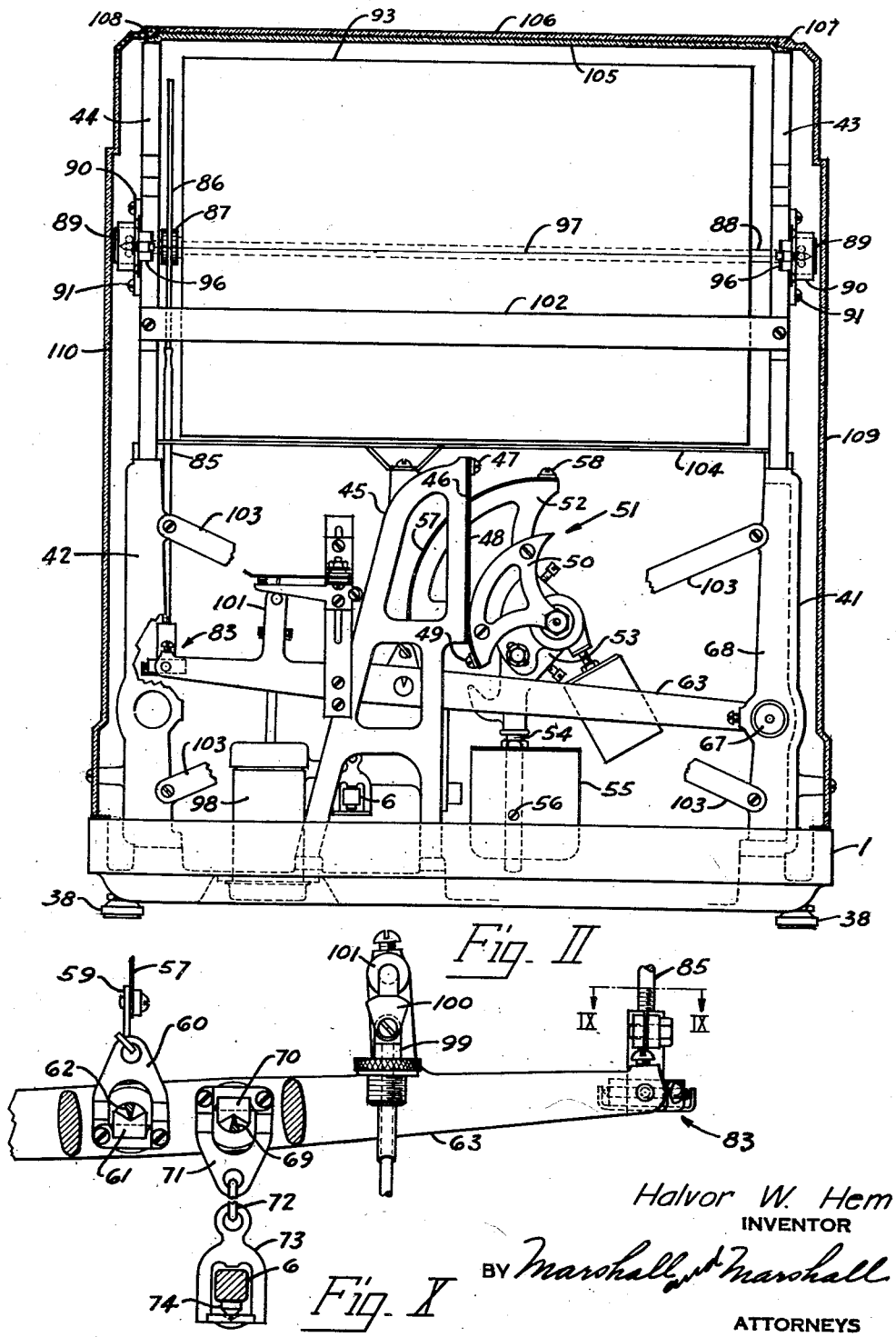
Halvor W. Hem
INVENTOR
BY Marshall & Marshall
ATTORNEYS Feb. 3, 1942.                H. W. HEM                2,272,150
                          WEIGHING SCALE
                        Filed Nov. 29, 1937          4 Sheets-Sheet 3
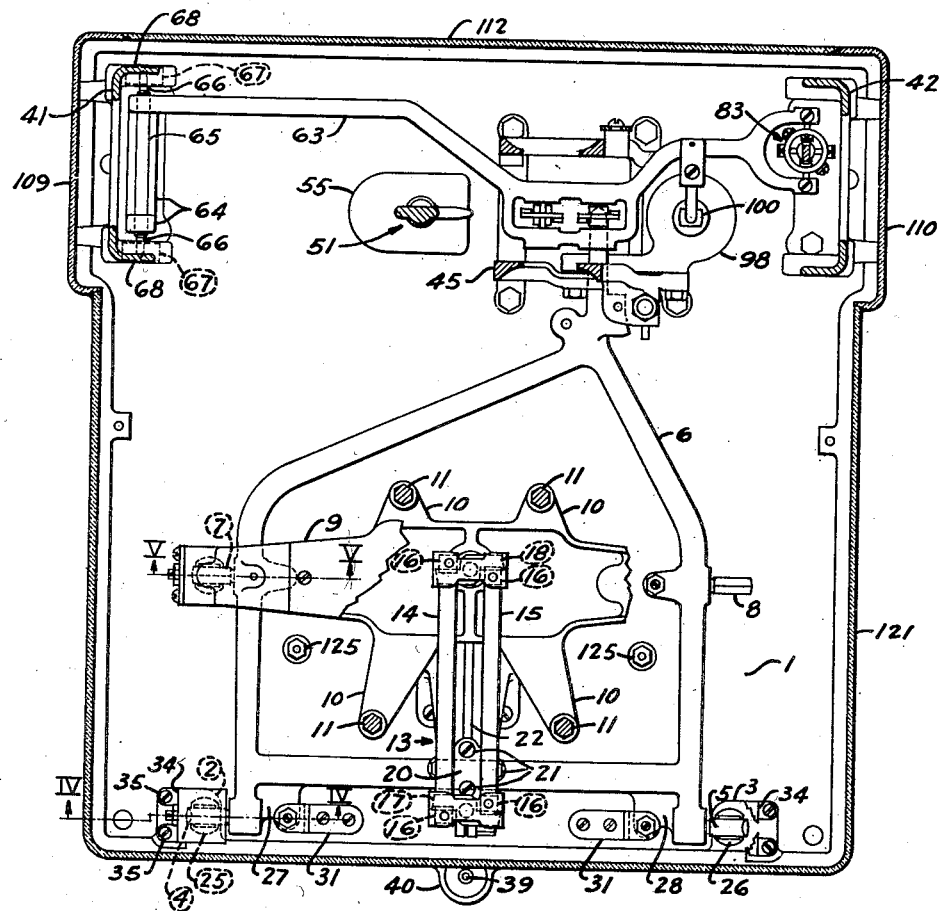
Fig. III
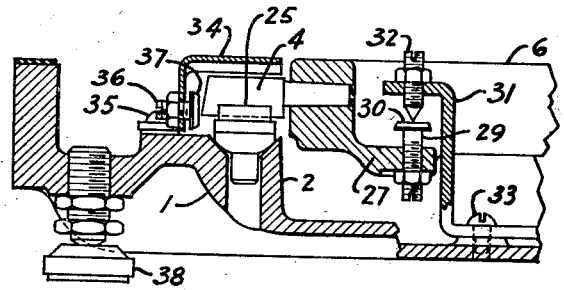
Fig. IV
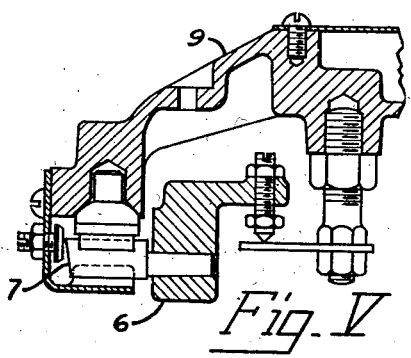
Fig. V
Halvor W. Hem
INVENTOR
BY Marshall & Marshall
ATTORNEYS Feb. 3, 1942.  H. W. HEM  2,272,150
WEIGHING SCALE
Filed Nov. 29, 1937    4 Sheets-Sheet 4
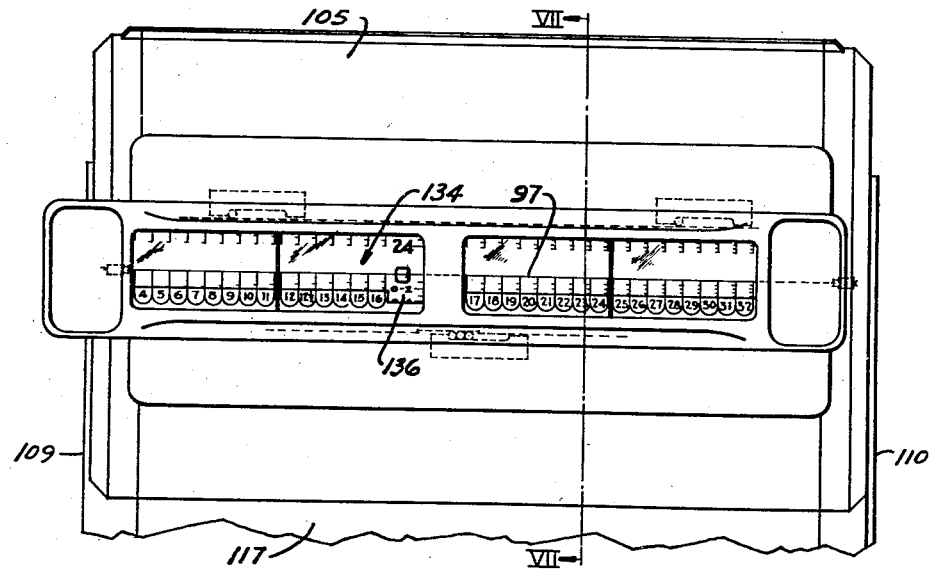
Fig. VI
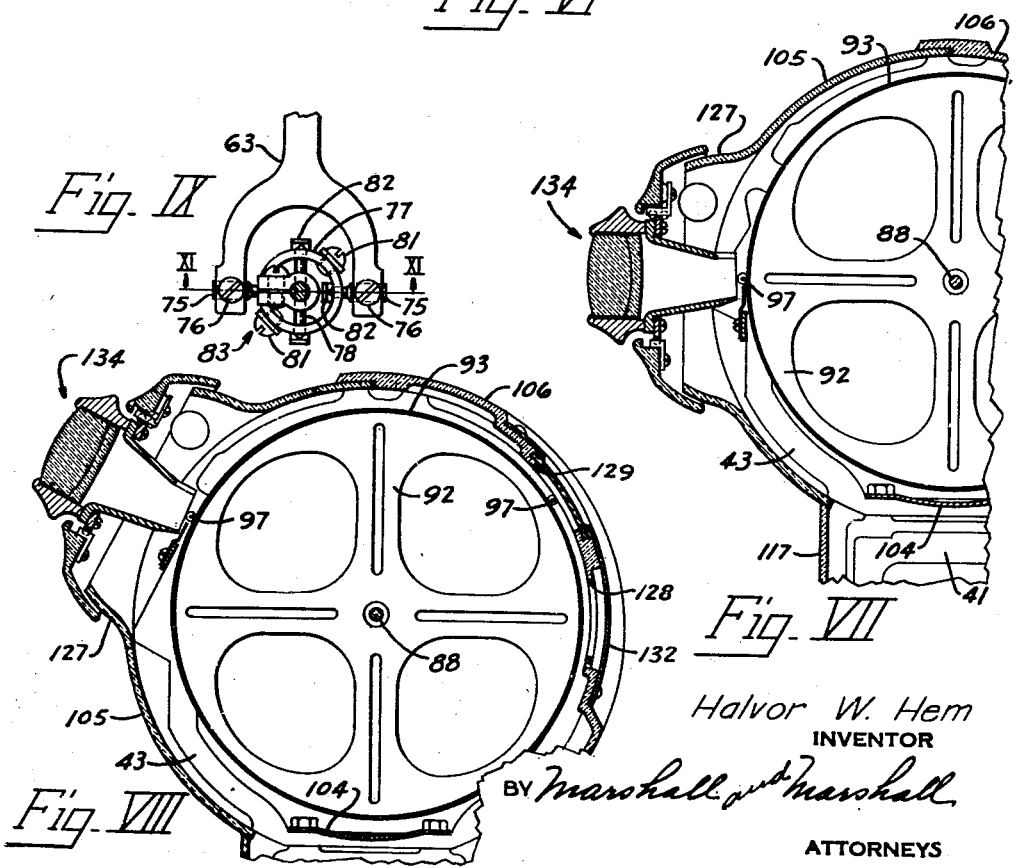
Fig. IX
Fig. VII
Fig. VIII
Halvor W. Hem
INVENTOR
BY Marshall and Marshall
ATTORNEYS Patented Feb. 3, 1942

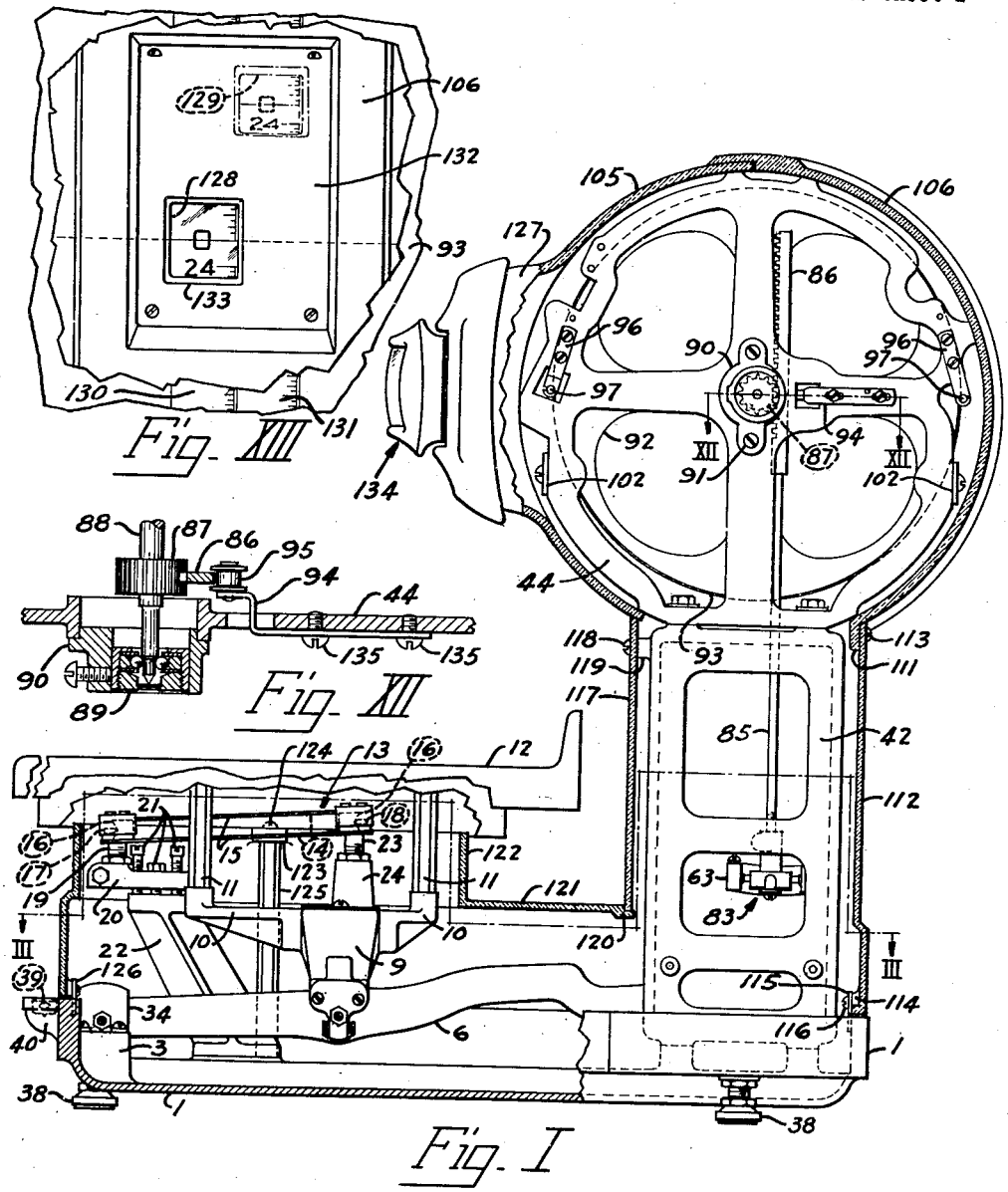

2,272,150

UNITED STATES PATENT OFFICE 2,272,150

WEIGHING SCALE

Halvor Warren Hem, Toledo, Ohio, assignor to Toledo Scale Company, a corporation of New Jersey Application November 29, 1937, Serial No. 177,047

11 Claims. (Cl. 265—37)

This invention relates to weighing scales, and more particularly to weighing scales for use in retail shops and is an improvement that is applicable especially to computing scales of the cylinder chart type.

The principal object of the invention is the provision of an improved light, compact weighing scale which is readily adaptable for use on relatively high or low supports.

Another object is the provision of improved means whereby a weighing scale adapted for use on a high support may readily be conditioned for use on a relatively low support.

Another object is the provision of improved means for selectively indicating weighing results along two angularly spaced lines of sight.

Another object is the provision of improved means for retaining movable scale members from shifting relatively to each other.

A further object is the provision of improved casing parts.

Still another object is the provision in a weighing scale of an improved combination of parts.

These, and other objects and advantages will be apparent from the following description, in which reference is had to the accompanying drawings illustrating a preferred embodiment of the invention and wherein similar reference numerals refer to similar parts throughout the several views.

In the drawings—

Figure I is a side elevational view of the device, housing and other members being broken away.

Figure II is a rear elevational view of the scale, the housing being broken away so that a clearer view may be had of the mechanism.

Figure III is a plan sectional view, the section being taken along the line III—III of Figure I.

Figure IV is a fragmentary sectional elevation of the lever fulcrum arrangement, sectioned along the line IV—IV of Figure III.

Fig. V is a similar view through the pivotal support of the load receiver, the section being on the line V—V of Figure III.

Figure VI is a fragmentary front elevational view of the indicating housing showing the chart adapted to be read on a horizontal line.

Figure VII is a fragmentary sectional view substantially along the line VII—VII of Figure VI.

Figure VIII is a similar sectional view along the line of Figure VI but showing a modification of the indicating position.

Figure IX is an enlarged fragmentary plan view of the rack foot as seen from along the line IX—IX of Figure X.

Figure X is an enlarged fragmentary view of the mechanism operating lever and showing in detail the means for connecting it to other scale mechanisms.

Figure XI is an enlarged sectional, elevational view through the rack foot, sectioned along the line XI—XI of Figure IX.

Figure XII is an enlarged fragmentary plan view, sectioned along the line XII—XII of Figure I; and, Figure XIII is an enlarged fragmentary elevational view of the customer's indication.

Referring to the drawings in detail:

A base 1 of the scale is preferably in the form of a rigid casting, integral therewith are fulcrum stands 2 and 3 upon which is mounted, by means of knife edged pivots 4 and 5, a lever 6 of the second order. This lever 6 is of skeleton form and is provided near its center with upwardly turned pivots 7 and 8 which are adapted to support bearings of a spider 9. This spider 9 has four horizontally extending arms 10 in which upwardly projecting posts 11 are studded for supporting a commodity receiver 12.

The condition of level of the commodity receiver 12 is maintained by means of a check link 13 located above the spider 9. This link consists of a pair of "pull" members 14 to prevent the commodity receiver from tilting in one direction and a pair of "push" members 15 to prevent it from tilting in the opposite direction. V bearings 16 alignably positioned respectively between the two members 14 and the two members 15 engage oppositely facing knife edges of pivots 17 and 18. The pivot 17 is riveted to a stud 19 which is threaded into a block 20 and suitably locked in adjusted position. This block 20, by means of screws 21, is adjustably positioned on the upper face of a bracket 22, bolted to the base 1. The pivot 18 is similarly riveted to the end of a stud 23 which is threaded into an upstanding boss 24 of the spider 9. By manipulating the screws 21 the block 20 is adjusted until the distance between the knife edges of the pivot 17 and the pivots 4 and 5 is equal to the distance between the knife edge of the pivot 18 and the edges of the pivots 7 and 8. This construction forms a force parallelogram of known type.

To prevent disengagement of the pivots 4 and 5 and the bearings 25 and 26 in which they rest, the lever 6 is provided with web-like inwardly projecting extensions 27 and 28 through which screws 29, having hardened and ground flat heads 30, are threaded. These screws are adjusted until their flat faces lie in a plane with the edges of the pivots 4 and 5. Z-shaped brackets 31 are bolted to machined pads on the base in such a position that one of the arms overlies the surface of the screw head 30. A retaining screw 32, having a conical point, is threaded through the overlying portion of the bracket 31, and is adjusted until its point just touches the head 30. To accurately position the brackets 31 so that the points of the conical ends of the screws 32 are collinear with the edges of the pivots 4 and 5 each of the screws 32 in turn is carefully turned downwardly so that pressure is exerted on the head 30. If the point is not collinear with the edges of the aforementioned pivots, but is located on one side, a movement of the lever in one direction will be observed and if it is located on the other side of the pivot edge, movement in the opposite direction will be observed. By moving the bracket back and forth until no movement of the lever is observed when either of the screws 32 is carefully turned and then tightening retaining screws 33 the exact point of adjustment is found. To prevent excessive endwise shifting of the lever 6, covers 34 which are bolted to suitable pads on the base 1 by means of screws 35, have thrust screws 36 threaded through their vertical walls. These thrust screws are provided with flat hardened heads 37 which are adapted to antifrictionally engage points on the ends of their edges of the pivots 4 and 5.

Each of the four corners of the base 1 is provided with a leveling screw 38 and a capsular spirit level 39 is set in a projecting lip 40 of the base 1 for the usual purpose.

To each corner of the opposite end of the base upstanding frames 41 and 42 are bolted and surmounting these frames are substantially circular casing spiders 43 and 44.

Located within the area defined by the corners of the frames 41 and 42 and bolted to the base is a sector guide 45. This sector guide, which is a skeleton casting, has two straight vertical tracks 46 to which are clamped, by means of screws 47, the upper ends of flexible metallic ribbons 48. The lower ends of these ribbons overlie and are clamped, by means of screws 49, to arcuate faces of fulcrum sectors 50 which form a part of a load counterbalancing pendulum 51. The pendulum 51, in addition to the fulcrum sectors 50, comprises a power sector 52, a pendulum body 53, a depending stem 54 which is studded into a portion of the body 53 and a pendulum weight 55 which is adjustably mounted on the stem 54 and which is provided with a set screw 56 so that it may be locked in proper position. The usual means for adjusting the relative position of the parts are provided.

To operatively connect the pendulum 51 to the base lever mechanism a ribbon 57 is provided which overlies the arcuate face of the power sector 52 to which its upper end is clamped by means of the screw 58. The lower end of this ribbon is secured to a stamped metallic hook-like member 59 whose hooked portion engages a stirrup 60 provided with a V bearing 61 which engages a power pivot 62 extending between furcated portions of an operating lever 63. This lever 63 is in the form of a casting and is of the third order, its fulcrum end is provided with an offset arm 64 in which a shaft 65, having hardened and ground ends 66, is fixed. These hardened and ground ends are mounted in ball bearings 67 which are positioned in flange-like sides 68 of the frame 41. The shaft 65 and the ball bearings 67 forming an antifriction fulcrum for the lever 63. Also extending between the furcations of the lever 63, in spaced relation to the pivot 62, is a load pivot 69 whose edge is engaged by a V bearing 70 alignably seated in a stirrup 71. This stirrup 71 is connected through a link 72 to a stirrup 73 having a suitable bearing for the reception of a cone pivot 74 fixed in the nose end of the lever 6.

To operatively connect the mechanism thus far described to load indicating means the free end of the lever 63 is bifurcated and provided with aligned, reamed holes in which pins 75 having turned-down hardened and ground portions are clamped by means of screws 76. These turned-down portions of the pins enter suitably positioned aligned holes in a gimbal ring 77. Another pair of aligned holes in the ring 77, whose axis extends at right angles to the axis of the holes which engage the pins 75, support the ends of a shaft 78 which projects through and is securely fixed in a clamp 79. A stamped and formed member 80 is secured to the gimbal ring 77 by means of screws 81 and turned-up hardened portions 82 serve as thrusts for the ends of the pins 75 and the shaft 78, thus maintaining the rack foot 83 formed by the aforedescribed parts in adjusted position. The upper portion of the clamp 79 is provided with a vertically extending threaded aperture and slotted ears 84 and the lower end of a rack rod 85 is threaded into this vertically extending aperture and is clamped by a screw which extends freely through one of the ears 84 and threaded into the other. This rod 85 carries at its upper end a rack 86 whose teeth engage the teeth of a pinion 87, circumjacently mounted on a chart shaft 88 whose ground and hardened ends rest in ball bearings 89 fixed in brackets 90 which are fastened by screws 91 to the casing spiders 43 and 44. A plurality of chart frames 92 are fixedly seated by means of suitable hubs on the chart shaft 88 and support a cylindrical chart 93 of thin aluminum, or paper, on which the usual weight and computed value indicia are printed. For the purpose of guiding the rack 86 and preventing its disengagement from the pinion 87, a bracket 94 (Figure XII), having a spool-like roller 95, is provided.

Clips 96 are screwed in proper position to the casing spiders 43 and 44 and support the ends of the usual index wires or threads 97. These threads 97 cooperate with the indicia on the chart to indicate the weight of the commodity being weighed to the merchant and to the customer on opposite sides of the scale in the usual manner.

For the purpose of damping the vibration of the scale mechanism the customary dashpot 98 is provided and a rod 99 of its plunger is secured through an arm 100 having a universal connection to an upstanding portion 101 of the lever 63. The construction and operation of dashpots are so well known that a further description is deemed unnecessary.

Braces 102, 103 and 104 are provided to tie the frames 41 and 42 and the casing spiders 43 and 44 into a rigid assembly.

The improved parts for encasing or housing the scale mechanism hereinbefore described are a feature of the invention. They are advantageously molded from a light colored synthetic resin material, preferably of the urea formaldehyde type since this material combines the necessary mechanical strength with lightness and appearance. However, stamped and formed or parts made from other materials, may be employed if they are similarly shaped.

The housing which encloses the indicating mechanism is composed of a front casing 105 and a back casing 106. These are substantially semi-circular and shaped to fit the periphery of the casing spiders 43 and 44. The edges of the sides of these casings are molded slightly tapering (see Figure II), and are retained in their places on the casing spiders by flanges 107 and 108 of housing end plates 109 and 110. The flanges of these end plates have a complementary taper. A flange 111 extending vertically downward from the lower edge of the casing 106 serves as a support for the upper edge of a back housing plate 112. Screws 113, which project through apertures in the plate 112, are threaded into this flange and securely hold this plate; its bottom edge is provided with bosses 114 to which clips 115 are fastened by means of screws 116. These clips 115 freely engage the inside vertical wall of the base 1.

The upper edge of a front plate 117 is molded to conform to the contour of the casing 105 which it abuts and is held in this position by screws 118 which are threaded into bosses 119 of the end frames 41 and 42. The lower edge of this front cover plate 117 rests on a ledge 120 formed on an edge of a substantially box-shaped base cover 121. A circular opening in the top of this base cover 121 is surrounded by a vertical wall 122 through which the load receiver supporting rods 11 project. Check link 13 also lies within this opening and, therefore, all check link adjustments are accessible when the load receiver 12 is removed. To retain the base cover 121 in position on the base 1, inwardly projecting ears 123 are molded on the wall 122 and through openings therein screws 124 are threaded into studs 125 which arise from the bottom of the base 1. To prevent relative displacement of the bottom of this base cover and the base a series of clips 126 are screwed to the inside of the base cover and freely engage the interior surface of the vertical wall of the base.

It is an object of this invention to enable the merchant to use the improved scale either on a low counter or on the top of modern refrigerator cases. It will be noticed that in the front casing 105 the arcuate distance from a horizontal line passing through the center of the hood-like projection 127 to its bottom edge, in the position as shown in Figure VII, is considerably less than the arcuate distance from the same horizontal line to its upper edge so that when the position of this front casing 105 is reversed on the casing spiders 43 and 44, that is, the lower edge is placed on the top, the center line through the indicating opening in the hood 127 now extends upwardly at an angle so that the merchant is enabled to place the scale on a low support and look downwardly at the chart indication. (Compare Figures VII and VIII.)

The back casing 106 is provided with two openings 128 and 129 offset from each other, the opening 128 being positioned so that graduations and indicia printed in a column 130 are visible therethrough while the opening 129 similarly cooperates with an adjacent column 131. The indicia and graduations in the two rows are the same with the exception that the zero graduation and indicium is visible through the opening 128 while the zero graduation and indicium of the row 131 is angularly offset and is visible in the opening 129 when the chart 93 is manipulatively positioned in the manner which will hereinafter be described, so that the zero indicium in the column 136 of indicia, adapted to indicate the weight to the merchant is visible in the indicating opening of the casing 105 when in the position shown in Figure VIII.

A rectangular scroll 132 is provided with a square opening 133 located substantially in the lower left quarter so that in the position shown in Figure XIII it overlies the opening 128 in the casing 106. When the position of the scroll 132 is reversed, the opening 133 then overlies the opening 129 in the casing 106 thus covering up the indicia of the row 130 heretofore visible and exposing the indicia in the column 131. The clips 96, which serve to retain the index wires 97, are so designed and positioned that when they are reversed the index will be in the proper position for the shifted indication.

The magnifying arrangement 134 for the merchant's indication, as shown in Figures I, VII and VIII, is fully described in U. S. Patents 1,973,685 to C. O. Marshall and 2,013,939 to L. S. Williams and, therefore, is not described herein.

In order to position the chart 93 to condition the scale for use on a low support, as shown in Figure VIII, screws 135 (Figure XII) are loosened and the bracket 94 with its guiding roller is slid away from the rack 86. This permits the teeth of the rack 86 to be disengaged from the teeth of the pinion 87 and the chart 93 to be revolved until the zero indicium in the column 136 of indicia indicating to the merchant is aligned with the indexes 97 which previously were reversed in the manner hereinbefore described. The teeth of the rack 86 and those of the pinion 87 are then enmeshed and the bracket 94 returned to its original position and the screws 135 tightened.

The operation of the scale is similar to that of other types of pendulum cylinder scales. When a load is placed on the commodity receiver 12 the lever 6 is depressed and the force transmitted through the stirrups 71 and 73 to the operating lever 63. This under the action of the force moves downwardly about its fulcrum and transmits a proportional amount of the force, through its power pivot, stirrup 60 and metallic ribbon 57 to the pendulum 51. Its pendulum weight 55, in the well known manner, moves outwardly and upwardly until its weight moment equals the weight moment occasioned by the load. The rack 86 partakes of the movement of the lever 63 and translates its reciprocatory motion into rotation and with the cooperation of the pinion 87 revolves the chart 93 a distance proportional to the weight of such load, that is until the graduation representing the weight of the load is in registration with the index line 97.

The embodiments of the invention herein shown and described are to be regarded as illustrative only, and it is to be understood that the invention is susceptible to variation, modification and change within the spirit and scope of the subjoined claims.

Having described my invention, I claim:

1. A weighing scale including in combination a base, load receiving mechanism mounted on said base, a plurality of frames mounted on the opposite end of said base, load counter-balancing and weight indicating mechanism supported on said frames, a housing for encasing said plurality of frames and said mechanisms supported thereon, another housing mounted on said base for encasing said load receiving mechanism, said housing for encasing said load indicating and counterbalancing mechanisms supporting frames comprising a plurality of separate sections, said housing for encasing said load receiving mechanism comprising an integrally formed part and having an opening therein for the passage therethrough of portions of said load receiving mechanism, a platform overlying said opening, and a check link for maintaining the condition of level of said platform, said check link lying within said opening.

2. In a device of the class described, in combination, load weighing mechanism having load indicating means including a chart operatively connected thereto, a zero indicium marked on said chart, a casing member for enclosing said chart, said casing member having an opening for exposing said zero indicium when positioned in certain relation to planes passing through said chart and said opening being designed and located in said casing member so as to expose said zero indicium positioned in different relation to such planes passing through said chart when the position of said casing member is reversed.

3. In a device of the class described, in combination, weighing mechanism having load indicating means including a cylindrical chart, a plurality of substantially semicircular casing members for enclosing and housing said chart, one of said plurality of casing members having an opening, said opening being substantially bisected by a horizontal plane passing through the axis of said chart when said casing members are assembled, the opening being so located in said casing member that it will be bisected by a plane passing through the axis of said chart at a substantial angle to the first mentioned plane when the position of said casing member is reversed in said assembly.

4. In a device of the class described, in combination, weighing mechanism including a cylindrical chart, a casing for housing said chart, said casing comprising a plurality of members having a plurality of apertures in spaced relation to each other, and a cover plate for attachment to one of said casing members having an aperture therein, said aperture being located in said cover plate to overlie one of said apertures in said casing member when attached thereto in one position and to overlie said other aperture when attached to said casing member in reversed position.

5. In a device of the class described, in combination, weighing mechanism including a cylindrical chart, a plurality of adjacent indicia bearing columns, said indicia being similar and representing pounds and fraction thereof, each of said columns having a zero indicium in echelon formation to each other, a casing for enclosing said chart and a pair of apertures in said casing, each of said apertures overlying a zero indicium and a cover plate with an aperture adapted to overlie one of said apertures in said casing member and to cover said other aperture in said casing member, said aperture in said cover plate being so located as to overlie said other aperture in said casing member and to cover said first mentioned aperture in said casing member when the position of said cover plate on said casing member is reversed.

6. In a device of the class described, in combination, load receiving mechanism, load counterbalancing mechanism connected thereto and load indicating mechanism actuated thereby, a plurality of substantially rigid frames for supporting said load receiving, load counterbalancing and load indicating mechanisms, said load counterbalancing and load indicating mechanisms being in superimposed relation, said substantially rigid frames for supporting said load counterbalancing mechanism being substantially rectangular and said substantially rigid frames for supporting said load indicating mechanism being substantially circular, a plurality of circularly-shaped cover members of light construction loosely placed on said circular frames and end casing members, adapted for attachment to said frames and having flanges for retaining said loosely placed indicator mechanism housing members in position.

7. In a device of the class described, in combination, load receiving mechanism, load counterbalancing mechanism connected thereto, and load indicating mechanism actuated thereby, a plurality of substantially rigid frames for supporting said load receiving, load counterbalancing and load indicating mechanisms, said load counterbalancing and load indicating mechanisms being in superimposed relation, said substantially rigid frames for supporting said load counterbalancing mechanism being substantially rectangular and said substantially rigid frames for supporting said indicating mechanism being substantially circular, a plurality of circularly-shaped cover members of light construction loosely placed on said circular frames, end casing members adapted for attachment to said frames and having flanges for retaining said loosely placed indicator mechanism housing members in position, the outer edges of said substantially circularly-shaped indicating housing members being tapered and the inner surfaces of said flanges of said end casing members having complementary taper.

8. In a device of the class described, in combination, load receiving mechanism, load counterbalancing mechanism connected thereto, and load indicating mechanism actuated thereby, a plurality of substantially rigid frames for supporting said load receiving, load counterbalancing and load indicating mechanisms, said load counterbalancing and load indicating mechanisms being in superimposed relation, said substantially rigid frames for supporting said load counterbalancing mechanism being substantially rectangular, said substantially rigid frames for supporting said indicating mechanism being substantially circular, a plurality of circularly-shaped cover members of light construction loosely placed on said circular frames, end casing members being adapted for attachment to said frames and having flanges for retaining said loosely placed indicator mechanism housing members in position, the outer edges of said substantially circularly-shaped indicating housing members being tapered and the inner surfaces of said flanges of said casing end members having a complementary taper and substantially flat rectangular front and back casing members adapted for attachment to said frames for housing said load counterbalancing mechanism.

9. In a device of the class described, in combination, load receiving mechanism, load counterbalancing mechanism connected thereto, and load indicating mechanism actuated thereby, a plurality of substantially rigid frames for supporting said load receiving, load counterbalancing and load indicating mechanisms, said load counterbalancing and load indicating mechanisms being in superimposed relation, said rigid frames for supporting said load counterbalancing mechanism being substantially rectangular, said substantially rigid frames for supporting said indicating mechanism being substantially circular, a plurality of circularly-shaped covering members of light construction loosely placed on said circular frames, end casing members adapted for attachment to said frames and having flanges for retaining said loosely placed indicator mechanism housing members in position, the outer edges of said substantially circularly-shaped indicating housing members being tapered and the inner surfaces of said flanges of said end casing members having a complementary taper and substantially flat rectangular front and back casing members adapted for attachment to said frames for housing said load counterbalancing mechanism and a substantially box-like cover for attachment to said load receiving mechanism supporting frame for enclosing said mechanism.

10. In a device of the class described, in combination, a base, load receiving mechanism including a platter, load counterbalancing mechanism and load indicating mechanism in cooperative relation, said load counterbalancing mechanism and said load indicating mechanism being in superimposed relation and located at one end of said base, said load receiving mechanism occupying the other end of said base, casing members for housing said load counterbalancing mechanism and said load indicating mechanism, a pair of upwardly extending bosses on said base, a substantially box-like casing for housing said load receiving mechanism and means for securing said substantially box-like casing to said upwardly extending bosses, said platter when in position overlying said means for securing said substantially box-like casing to said upwardly extending bosses.

11. In a device of the class described, in combination, a base, load receiving mechanism including a platter, load counterbalancing mechanism and load indicating means in cooperative relation, said load counterbalancing mechanism and said load indicating mechanism being in superimposed relation and located at one end of said base, said load receiving mechanism occupying the other end of said base, casing members for housing said load counter-balancing mechanism and said load indicating means, a pair of upwardly extending bosses on said base, a substantially box-like formed casing for housing said load receiving mechanism and means for securing said substantially box-like casing to said upwardly extending bosses, said means comprising integral extending ears on said casing and screws for securing said ears to said bosses, said platter overlying and concealing said screws.

HALVOR WARREN HEM.